United States Patent [19]

Cavitt

[11] Patent Number: 4,855,366

[45] Date of Patent: Aug. 8, 1989

[54] MONOCARBOXYLIC ACID DERIVATIVES OF AROMATIC BASED EPOXY RESINS

[75] Inventor: Michael B. Cavitt, Lake Jackson, Tex.

[73] Assignee: The Dow Chemical Company, Midland, Mich.

[21] Appl. No.: 210,050

[22] Filed: Jun. 22, 1988

[51] Int. Cl.$^4$ ............................................. C08G 59/16
[52] U.S. Cl. ..................................... 525/533; 525/507; 525/531; 528/112; 528/113; 528/365; 528/98; 528/99
[58] Field of Search ............. 525/507, 531, 533, 501.5; 528/112, 113, 365, 98, 99

[56] References Cited

U.S. PATENT DOCUMENTS

| | | | |
|---|---|---|---|
| 3,144,421 | 8/1964 | Yost | 260/18 |
| 3,507,819 | 4/1970 | Vegter et al. | 260/18 |
| 3,553,119 | 1/1971 | Wright et al. | 525/533 |
| 3,598,775 | 8/1971 | Huggard | 260/18 |
| 4,098,735 | 7/1978 | Tobias | 525/533 X |
| 4,139,510 | 2/1979 | Anderson | 525/533 X |
| 4,141,865 | 2/1979 | Bogan | 525/533 X |
| 4,247,659 | 1/1981 | Sekmakas et al. | 525/533 X |
| 4,252,935 | 2/1981 | Anderson et al. | 528/45 |
| 4,486,556 | 12/1984 | Kordomenos et al. | 523/400 |
| 4,721,743 | 1/1988 | Cavitt et al. | 523/427 |

OTHER PUBLICATIONS

CA 86:156522h, (1977).
CA 96:200726k, (1982).
CA 105:154121p, (1986).
CA 87:118732q, (1977).
Derwent Abs. 79546Y/45, (1981).
CA 92:78264h, (1980).
CA 105:116736k, (1986).
Derwent Abs. 64506 C/37, (1982).
Karel Dusek (Editor) in "Epoxy Resins and Composites III", Advances in Polymer Science, vol. 78, pp. 1–59, (1986).
Libor Matejka, Svatopluk Pokomy and Karel Dusek in "Network Formation Involving Epoxide and Caboxy Groups (Course of the Model Reaction Monoepoxide–Monocabonic Acid)", Polymer Bulletin, vol. 7, pp. 123–128, (1982).

Primary Examiner—Earl Nielsen

[57] ABSTRACT

A low viscosity product is obtained when an adduct is prepared by reacting (A) at least one polyglycidyl ether of a compound containing an average of more than one phenolic hydroxy group per molecule and (B) at least one aliphatic monocarboxylic acid containing 7 to 15 carbon atoms per molecule; wherein components (A) and (B) are present in amounts which provide a ratio of carboxylic acid groups per epoxide group of from about 0.01:1 to about 0.2:1.

32 Claims, No Drawings

MONOCARBOXYLIC ACID DERIVATIVES OF AROMATIC BASED EPOXY RESINS

FIELD OF THE INVENTION

The present invention concerns modified epoxy resins. Particularly, it concerns monocarboxylic acid modified aromatic based polyether polyepoxy resins so as to reduce the viscosity of the resin.

BACKGROUND OF THE INVENTION

Epoxy resins have been employed to prepare coatings, encapsulations, moldings, laminates and the like. However, in many applications they are applied from organic solvents. It is desirable from an environmental standpoint to reduce the viscosity of the epoxy resin so as to reduce the amount of organic solvent necessary to achieve the desired application viscosity. One method for reducing the viscosity of epoxy resin coating compositions is to employ low viscosity additive. In many instances, these additives are expensive and in some instances may be skin sensitizers. It would therefore be desirable to have alternative means for reducing the viscosity of epoxy resins.

The present invention therefore provides an alternative method for reducing the viscosity of epoxy resins.

SUMMARY OF THE INVENTION

One aspect of the present invention pertains to an adduct of (A) at least one polyglycidyl ether of a compound containing an average of more than one phenolic hydroxyl group per molecule and (B) at least one aliphatic monocarboxylic acid containing from 7 to 15 carbon atoms per molecule; wherein components (A) and (B) are present in amounts which provide a ratio of carboxylic acid groups per epoxide group of from about 0.01:1 to about 0.2:1.

Another aspect of the present invention pertains to a thermosettable composition comprising the aforementioned adduct and a curing amount of a suitable curing agent therefor.

A further aspect of the present invention pertains to the cured product resulting from subjecting the aforementioned thermosettable composition to conditions sufficient to effect curing thereof.

DETAILED DESCRIPTION OF THE INVENTION

The adducts of the present invention can be prepared by reacting the epoxy resin, component (A), with the monocarboxylic acid, component (B), at a temperature suitably from about 110° C. to about 190° C., more suitably from about 140° C. to about 185° C., most suitably from about 160° C. to about 180° C., for a time sufficient to complete the desired reaction which is suitably from about 0.5 to about 3, more suitably from about 1 to about 2, most suitably from about 1 to about 1.5, hours. At the lower temperatures, longer reaction times are required whereas at the higher temperatures less reaction times are required to complete the reaction. At temperatures above about 190° C. and at the longer reaction times, undesired reactions may occur such as those disclosed by Karel Dusek (Editor) in "Epoxy Resins and Composites III", Advances in Polymer Science, vol. 78, pp 1–59 (1986) and Libor Matejka, Svatopluk Pokomy and Karel Dusek in "Network Formation Involving Epoxide and Carboxyl Groups (Course of the Model Reaction Monoepoxide-Monocabonic Acid)", *Polymer Bulletin*, vol, 7, pp 123–128 (1982), both of which are incorporated herein by reference in their entirety. At temperatures below about 110° C., the reaction time becomes longer which may be inconvenient. The reaction can be conducted at any suitable pressure from subatmospheric to superatmospheric; however, atmospheric pressure is preferred.

The epoxy resin and the monocarboxylic acid are employed in amounts which provide a ratio of equivalent of carboxylic acid to epoxide equivalent suitably from about 0.01:1 to about 0.2:1, more suitably from about 0.02:1 to about 0.15:1, most suitably from about 0.03:1 to about 0.1:1.

If desired, the reaction can be conducted in the presence of a suitable catalyst for conducting the reaction between an epoxy group and a carboxylic acid group. Suitable such catalysts include, for example, phosphonium compounds, tertiary amines, and the like.

Suitable tertiary amine catalysts include, for example, triethylamine, tributylamine, benzyldimethylamine, tris(dimethylaminomethyl)phenol, dimethylethanolamine, n-methylmorpholine, combinations thereof and the like.

Suitable phosphonium compounds include, for example, those disclosed by Dante et al. in U.S. Pat. No. 3,477,990, by Perry in Canadian Pat. No. 893,191 and U.S. Pat. No. 3,948,855, and Tyler, Jr. et al. in U.S. Pat. No. 4,366,295, all of which are incorporated herein by reference. Particularly suitably phosphonium catalysts include, for example, ethyl triphenyl phosphonium acetate.acetic acid complex, ethyl triphenyl phosphonium chloride, ethyl triphenyl phosphonium iodide, ethyl triphenyl phosphonium phosphate, tetrabutyl phosphonium acetate.acetic acid complex, tetrabutyl phosphonium chloride, tetrabutyl phosphonium iodide, tetrabutyl phosphonium phosphate, combinations thereof and the like.

The amount of catalyst to be employed is that amount which will effectively catalyze the reaction between the epoxy resin and the monocarboxylic acid. The specific amount of catalyst will depend upon the particular reactants and catalyst being employed. Generally, the catalyst is employed in amounts suitably from about 0.0002 to about 0.004, more suitably from about 0.0004 to about 0.002, most suitably from about .0005 to about 0.001, mole of catalyst per epoxide equivalent.

Suitable aliphatic monocarboxylic acids which can be employed herein include those represented by the following Formula I

Formula I wherein $R^a$ is a monovalent aliphatic hydrocarbon group having suitably from 6 to 14, more suitably from about 7 to about 13, most suitably from about 8 to about 13, carbon atoms. Particularly suitable monocarboxylic acids include, for example, heptanoic acid, octanoic acid, pelargonic acid (nonanoic acid), decanoic acid, lauric acid (dodecanoic acid), myristic acid (tetradecanoic acid), pentadecanoic acid, combinations thereof and the like.

Suitable aromatic epoxy resins which can be employed herein includ ethe polyglycidyl ethers of aromatic hydroxyl containing compounds such as, for example, the diglycidyl ethers of dihydroxy aromatic compounds, the polyglycidyl ethers of phenol- or substituted phenol-aldehyde novolac resins. Particularly suitable epoxy resins include, those represented by the following Formulas II, III, IV and V:

FORMULA II

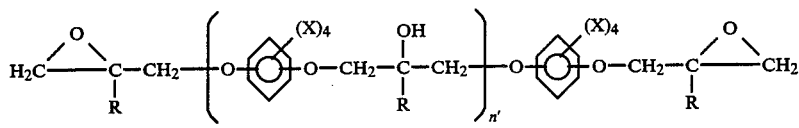

FORMULA III

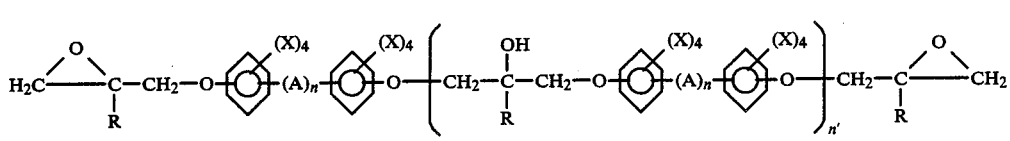

FORMULA IV

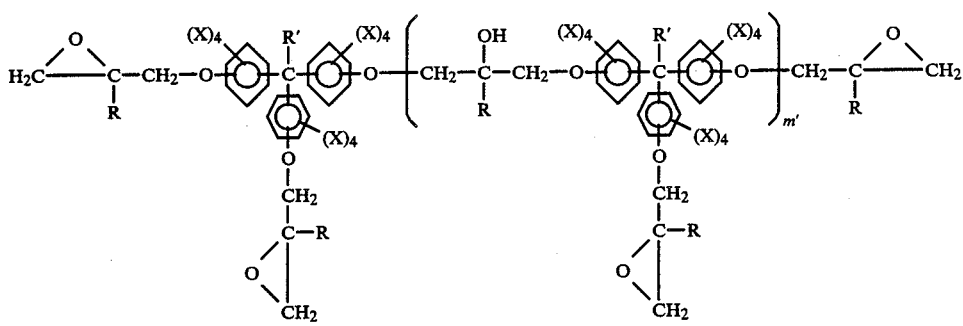

FORMULA V

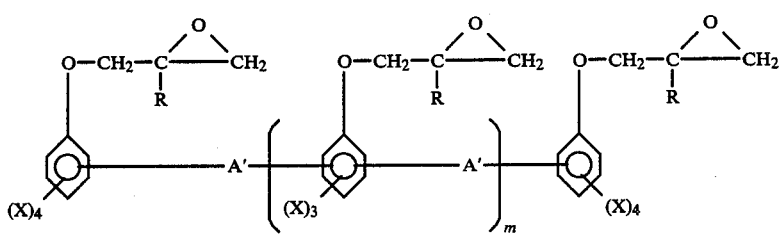

wherein each A is independently a divalent hydrocarbyl group having suitably from 1 to about 12, more suitably from 1 to about 6, most suitably from 1 to about 4, carbon atoms, —S—, —S—S—, —SO—, —SO$_2$—, —CO—, or —O—; each R is independently hydrogen or an alkyl group having from 1 to about 4 carbon atoms; R' is hydrogen or a hydrocarbyl group having suitably from 1 to about 12, more suitably from 1 to about 6, most suitably from 1 to about 4, carbon atoms; each X is independently hydrogen, a hydrocarbyl or hydrocarbyloxy group having suitably from 1 to about 12, more suitably from 1 to about 6, most suitably from 1 to about 4, carbon atoms, or a halogen atom preferably chlorine or bromine; m has an average value suitably from about 0.001 to about 3, more suitably from about 0.1 to about 2, most suitably from about 1 to about 2; m' has an average value suitably from about 0.001 to about 3, more suitably from 0.1 to about 2, most suitably from about 1 to about 2; n has a value of zero or 1; n' has an average value suitably from zero to about 0.5, more suitably from about 0.01 to about 0.2, most suitably from about 0.01 to about 0.1.

The term hydrocarbyl as employed herein means any aliphatic, cycloaliphatic, aromatic, aryl substituted aliphatic or cycloaliphatic, or aliphatic or cycloaliphatic substituted aromatic groups. The aliphatic groups can be saturated or unsaturated. Likewise, the term hydrocarbyloxy means a hydrocarbyl group having an oxygen linkage between it and the object to which it is attached.

Particularly suitable epoxy resins include, for example, the diglycidyl ethers of dihydric phenols, such as, for example, the diglycidyl ethers of bisphenol A, bisphenol F, bisphenol K, dihydroxy biphenyl (biphenol), combinations thereof and the like.

The epoxy resin adducts of the present invention can be cured with any suitable curing agent for epoxy resins including, for example, primary and second polyamines, carboxylic acids and anhydrides thereof, Lewis acids, phenolic hydroxyl-containing compounds, guanidines, biguanides, polyamides, combinations thereof and the like. Particularly suitable curing agents include, for example, ethylene diamine, diethylenetriamine, triethylenetetramine, adipic acid, phosphoric acid, dicyandiamide, diaminocyclohexane, combinations thereof and the like. The curing agents are employed in an amount which will effectively cure the composition containing the epoxy resin adduct. These amounts will depend upon the particular epoxy resin adduct and curing agent employed; however, suitable amounts include, for example, from about 0.6 to about 1, more suitably from about 0.8 to about 1, most suitably from about 1 to about 1 equivalent of curing agent per epoxide equivalent for those curing agents which cure by reacting with the epoxy group of the epoxy resin. The *Handbood of Epoxy Resins* by Lee and Neville, McGraw-Hill, 1967 contains various discussions concerning the curing of epoxy resins as well as compilation of suitable curing agents. This handbood is incorporated herein by reference.

If desired, the thermosettable compositions of the present invention can be blended with other materials such as solvents or diluents, fillers, pigments, dyes, flow modifiers, thickeners, reinforcing agents, fire retarding or suppressing agents, combinations thereof and the like.

These additives are added in functionally equivalent amounts eg, the pigments and/or dyes are added in quantities which will provide the composition with the desired color; however, they are suitably employed in amounts of from about 5 to about 50, more suitably from about 5 to about 40, most suitably from about 10 to about 40 percent by weight based upon the combined weight of the epoxy resin and curing agent.

Solvents or diluents which can be employed herein include, for example, hydrocarbons, ketones, glycol ethers, glycol ether acetates, combinations thereof and the like. Particularly suitable solvents or diluents include, for example, toluene, benzene, xylene, methyl ethyl ketone, methyl isobutyl ketone, diethylene glycol methyl ether, dipropylene glycol methyl ether, propylene glycol methyl ether, diethylene glycol methyl ether acetate, dipropylene glycol methyl ether acetate, propylene glycol methyl ether acetate, combinations thereof and the like.

The modifiers such as thickeners, flow modifiers and the like can be suitably employed in amounts of from about 0.05 to about 3, more suitably from about 0.1 to about 3, most suitably from about 0.1 to about 2 percent by weight based upon the combined weight of epoxy resin and curing agent.

Reinforcing materials which can be employed herein include natural and synthetic fibers in the form of woven, mat, monofilament, multifilament, chopped fibers and the like. Suitable reinforcing materials include, glass, ceramics, nylon, rayon, cotton, aramid, graphite, combinations thereof and the like.

Suitable fillers which can be employed herein include, for example, inorganic oxides, inorganic carbonates, ceramic microspheres, plastic microspheres, glass microsphers, clay, sand, gravel, combinations thereof and the like.

The fillers can be employed in amounts suitably from about 5 to about 50, more suitably from about 5 to about 40, most suitably from about 10 to about 40 percent by weight based upon the combined weight of epoxy resin and curing agent.

The epoxy resin adducts of the present invention can be formulated for use in such applications as, for example, flooring, casting, molding, adhesives, potting, filament winding, encapsulation, structural and electrical laminates, composites, coatings and the like.

The following examples are ilustrative of the present invention, but are not to be construed as to limiting the scope thereof in any manner.

The following components are employed in the examples.

EPOXY RESIN A is a diglycidyl ether of bisphenol A having an EEW of about 182.6 and a viscosity of about 7959 cks (0.007959 m$^2$/s) at 25° C..

EPOXY RESIN B is a diglycidyl ether of bisphenol A having an EEW of about 181 and a viscosity of about 7755 cks (0.007755 m$^2$/s) at 25° C..

EPOXY RESIN C is a diglycidyl ether of bisphenol A having an EEW of about 180 and a viscosity of about 7963 cks (0.007963 m$^2$/s) at 25° C..

EPOXY RESIN D is the diglycidyl ether of phenol-formaldehyde resin (bisphenol F) with an average epoxy functionality of about 2 having an EEW of about 160 and a viscosity of about 947 cks (0.000947 m$^2$/s) at 25° C.

EPOXY RESIN E is the glycidyl ether of phenol-formaldehyde novolac resin with an average epoxy functionality of about 3.6 having an EEW of about 178.5 and a viscosity of about 2735 cps (2.735 Pas) at 70° C..

CATALYST is a 70 weight percent solution of ethyl triphenyl phosphonium acetate.acetic acid complex in methanol.

COMPARATIVE EXPERIMENT A

To a reaction vessel equipped with a nitrogen purge, stirrer, temperature control and condenser is added about 195.7 gms (1.0717 epoxy equiv.) of EPOXY RESIN A, about 4.3 gms (0.0716 carboxyl equiv.) of glacial acetic acid. The contents are then heated to about 95° C. whereupon about 0.4 gm (0.0007 mole) of CATALYST is added. The temperature is increased to about 110° C. and maintained for about 1.6 hours. The resultant compound had a percent epoxide of about 21.1 and a viscosity of abouot 13249 cks (0.013249 m$^2$/s) at 25° C..

COMPARATIVE EXPERIEMENT B

To a reaction vessel equipped with a nitrogen purge, stirrer, temperature control and condenser is added about 484.45 gms (2.6765 epoxy equiv.) of EPOXY RESIN B, about 15.55 gms (0.1771 carboxyl equiv.) of butyric acid. The contents are then heated to about 90° C. whereupon about 0.88 gm (0.0015 mole) of CATALYST is added. The temperature is increased to about 140° C. and maintained for about 1.25 hours. The resultant compound had a percent epoxide of about 21.79 and a viscosity of about 8524 cks (0.008524 m$^2$/s) at 25° C..

COMPARATIVE EXPERIMENT C

To a reaction vessel equipped with a nitrogen purge, stirrer, temperature control and condenser is added about 481.45 gms (2.6599 epoxy equiv.) of EPOXY RESIN B, about 18.6 gms (0.1567 carboxyl equiv.) of hexanoic acid. The contents are then heated to about 90° C. whereupon about 0.87 gm (0.0015 mole) of CATALYST is added. The temperature is increased to about 180° C. and maintained for about 1 hour. The resultant compound had a percent epoxide of about 21.65 and a viscosity of about 7899 cks (0.007899 m$^2$/s) at 25° C..

COMPARATIVE EXPERIMENT D

To a reaction vessel equipped with a nitrogen purge, stirrer, temperature control and condenser is added about 472.15 gms (2.6086 epoxy equiv.) of EPOXY RESIN B, about 27.8 gms (0.1084 carboxyl equiv.) of palmitic acid (hexadecanoic acid). The contents are then heated to 90° C. whereupon about 0.86 gm (0.0015 mole) of CATALYST is added. The temperature is increased to about 180° C. and maintained for about 1 hour. The resultant compound had a percent epoxide of about 21.47 and a viscosity of about 11,840 cks (0.011840 m$^2$/s) at 25° C..

COMPARATIVE EXPERIMENT E

To a reaction vessel equipped with a nitrogen purge, stirrer, temperature control and condenser is added about 462 gms (2.5525 epoxy equiv.) of EPOXY RESIN B, about 38 gms (0.1336 carboxyl equiv.) of stearic acid (octadecanoic acid). The contents are then heated to about 100° C. whereupon about 0.4 gm (0.0007 mole) of CATALYST is added. The temperature is increased to about 180° C. and maintained for about 1 hour. The resultant compound had a percent epoxide of about 21.5 and is a solid at 25° C..

COMPARATIVE EXPERIMENT F

To a reaction vessel equipped with a nitrogen purge, stirrer, temperature control and condenser is added about 100 gms (0.625 epoxy equiv.) of EPOXY RESIN D, about 1.78 gms (0.0297 carboxyl equiv). of glacial acetic acid. The contents are then heated to about 90° C. whereupon about 0.15 gm (0.0003 mole) of CATALYST is added. The temperature is increased to about 110° C. and maintained for about 2 hours. The resultant compound had a percent epoxide of about 25.1 and a viscosity of about 1256 cks (0.01256 m²/s) at 25° C..

COMPARATIVE EXPERIMENT G

To a reaction vessel equipped with a nitrogen purge, stirrer, temperature control and condenser is added about 100 gms (0.625 epoxy equiv.) of EPOXY RESIN D, about 3.4 gms (0.0292 carboxyl equiv.) of hexanoic acid. The contents are then heated to about 90° C. whereupon about 0.15 gm (0.0003 mole) of CATALYST is added. The temperature is increased to about 170° C. and maintained for about 1 hour. The resultant compound had a percent epoxide of about 24.8 and a viscosity of about 962 cks (0.000962 m²/s) at 25° C..

EXAMPLE 1

To a reaction vessel equipped with a nitrogen purge, stirrer, temperature cntrol and condenser is added about 215.6 gms (1.1978 epoxy equiv.) of EPOXY RESIN C, about 12.9 gms (0.0723 carboxyl equiv.) of heptanoic acid. The contents are then heated to about 90° C. whereupon about 0.3 gm (0.0005 mole) of CATALYST is added. The temperature is increased to about 160° C. and maintained for about 1 hour. The resultant compound hd a percent epoxide of about 21.5 and a viscosity of about 7836 cks (0.007836 m²/s) at 25° C..

EXAMPLE 2

To a reaction vessel equipped with a nitrogen purge, stirrer, temperature control and condenser is added about 478.95 gms (2.6461 epoxy equiv.) of EPOXY RESIN B, about 21 gms (0.1456 carboxyl equiv.) of octanoic acid. The contents are then heated to about 90° C. whereupon about 0.86 gm (0.0015 mole) of CATALYST is added. The temperature is increased to about 180° C. and maintained for about 0.9 hour. The resultant compound had a percent epoxide of about 21.49 and a viscosity of about 7287 cks (0.007287 m²/s) at 25° C..

EXAMPLE 3

To a reaction vessel equipped with a nitrogen purge, stirrer, temperature control and condenser is added about 960 gms (5.2574 epoxy equiv.) of EPOXY RESIN A, about 40 gms (0.253 carboxyl equiv.) of pelargonic acid. The contents are then heated to about 90° C. whereupon about 0.8 gm (0.0014 mole) of CATALYST is added. The temperature is increased to about 180° C. and maintained for about 2 hours. The resultant compound had a percent epoxide of about 21.2 and a viscosity of about 7051 cks (0.007051 m²/s) at 25° C..

EXAMPLE 4

To a reaction vessel equipped with a nitrogen purge, stirrer, temperature control and condenser is added about 476.85 gms (2.6345 epoxy equiv.) of EPOXY RESIN B, about 23.2 gms (0.1346 carboxyl equiv.) of decanoic acid. The contents are then heated to about 90° C. whereupon about 0.86 gm (0.0015 mole) of CATALYST is added. The temperature is increased to about 180° C. and maintained for about 1 hour. The resultant compound had a percent epoxide of about 21.63 and a viscosity of about 7082 cks (0.007082 m²/s) at 25° C..

EXAMPLE 5

To a reaction vessel equipped with a nitrogen purge, stirrer, temperature control and condenser is added about 3253.6 gms (17.9757 epoxy equiv.) of EPOXY RESIN B, about 171 gms (0.8537 carboxyl equiv.) of lauric acid. The contents are then heated to about 90° C. whereupon abut 3 gms (0.0051 mole) of CATALYST is added. The temperature is increased to about 160° C. and maintained for about 0.9 hour. The resultant compound had a percent epoxide of about 21.5 and a viscosity of about 6808 cks (0.006808 m²/s) at 25° C..

EXAMPLE 6

To a reaction vessel equipped with a nitrogen purge, stirrer, temperature control and condenser is added about 473.5 gms (2.6105 epoxy equiv.) of EPOXY RESIN B, about 26.5 gms (0.116 carboxyl equiv.) of myristic acid. The contents are then heated to about 90° C. whereupon about 0.86 gm (0.0015 mole) of CATALYST is added. The temperature is increased to about 180° C. and maintained for about 1 hour. The resultant compound had a percent epoxide of about 21.44 and a viscosity of about 6143 cks (0.006143 m²/s) at 25° C..

EXAMPLE 7

To a reaction vessel equipped with a nitrogen purge, stirrer, temperature control and condenser is added about 212.1 gms (1.1783 epoxy equiv.) of EPOXY RESIN C, about 12.9 gms (0.0533 carboxyl equiv.) of pentadecanoic acid. The contents are then heated to about 90° C. whereupon about 0.3 gm (0.0005 mole) of CATALYST is added. The temperature is increased to about 160° C. and maintained for about 1 hour. The resultant compound had a percent epoxide of about 21.4 and a viscosity of about 6270 cks (0.006270 m²s) at 25° C.

EXAMPLE 8

To a reaction vessel equipped with a nitrogen purge, stirrer, temperature control and condenser is added about 100 gms (0.625 epoxy equiv.) of EPOXY RESIN D, about 5.9 gms (0.0295 carboxyl equiv.) of lauric acid. The contents are then heated to about 90° C. whereupon about 0.15 gm (0.0003 mole) of CATALYST is added. The temperature is increased to about 170° C. and maintained for 1 hour. The resultant compound had a percent epoxide of about 24.1 and a viscosity of about 903 cks (0.000903 m²/s) at 25° C..

EXAMPLE 9

To a reaction vessel equipped with a nitrogen purge, stirrer, temperature control and condenser is added about 100 gms (0.625 epoxy equiv.) of EPOXY RESIN D, about 6.7 gms (0.0294 carboxyl equiv.) of myristic acid. The contents are then heated to about 90° C.

whereupon about 0.15 gm (0.0003 mole) of catalyst is added. The temperature is increased to about 170° C. and maintained for about 1 hour. The resultant compound had a percent epoxide of about 24 and a viscosity of about 901 cks (0.000901 m²/s) at 25° C..

EXAMPLE 10

To a reaction vessel equipped with a nitrogen purge, stirrer, temperature control and condenser is added about 212.2 gms (1.1888 epoxy equiv.) of EPOXY RESIN E, about 12.8 gms (0.064 carboxyl equiv.) of lauric acid. The contents are then heated to about 90° C. whereupon about 0.3 gm (0.0005 mole) of CATALYST is added. The temperature is increased to about 160° C. and maintained for about 1 hour. The resultant compound had a percent epoxide of about 21.5 and a viscosity of about 1908 cp (1.908 Pas) at 70° C..

EXAMPLE 11

Panels coated with compounds of the present invention are prepared in the following manner. The panels are coated using a number 50 draw down bar. After coating the unpolished and untreated cold rolled steel 24 gauge (0.63 mm)×12 in.×4 in. (304.8 mm x 101.6 mm) panel, it is placed into an oven at a temperature of about 125° C. for cure. After curing, the coating is tested in the following manner. The coating is cut in such a manner that about 100 small blocks are made. This is accomplished by cutting horizontal lines and vertical lines measuring about 1.5 x 1.5 cm total size. The amount of coated blocks remaining is recorded. The higher the amount of coating remaining the better the coating. The results are given in the Table II.

TABLE II

| TEST NO. | RESIN EMPLOYED | RESIN AMOUNT (g) | AMOUNT OF CURING AGENT (g) | CURE TIME (min.) | CROSSHATCH TEST % OF COATING REMAINING |
|---|---|---|---|---|---|
| * | EPOXY RESIN C | 8 | 1.08$^a$ | 15$^b$ | 55 |
| 2 | EXAMPLE 7 | 8 | 0.97$^a$ | 15$^b$ | 83 |

*Not an example of the present invention.
$^a$Triethylenetetramine with an amine hydrogen equivalent weight of 24.3.
$^b$Cured 15 minutes at 125° C.

What is claimed is:
1. An adduct of (A) at least one polyglycidyl ether of a compound containing an average of more than one

TABLE I

| | | VISCOSITY SUMMARY | | | |
|---|---|---|---|---|---|
| Example or Comp. Expt. | No. of Carbon Atoms in Acid | INITIAL VISCOSITY | | VISCOSITY AFTER REACTION WITH ACID | PERCENT CHANGE |
| COMP. EXPT. A* | 2 | 7959$^a$ | .007959$^c$ | 3249$^a$ .013249$^c$ | +66.5 |
| COMP. EXPT. B* | 4 | 7759$^a$ | .007759$^c$ | 8524$^a$ .008524$^c$ | +9.9 |
| COMP. EXPT. C* | 6 | 7759$^a$ | .007759$^c$ | 7899$^a$ .007899$^c$ | +1.2 |
| COMP. EXPT. D* | 16 | 7759$^a$ | .007759$^c$ | 11840$^a$ .011840$^c$ | +52.9 |
| COMP. EXPT. E* | 18 | 7759$^a$ | .007759$^c$ | Solid Solid | N/D$^e$ |
| COMP. EXPT. F* | 2 | 947$^a$ | .000947$^c$ | 1256$^a$ .001256$^c$ | +32.6 |
| COMP. EXPT. G* | 6 | 947$^a$ | .000947$^c$ | 962$^a$ .000962$^c$ | +1.6 |
| EX. 1 | 7 | 7963$^a$ | .007963$^c$ | 7836$^a$ .007836$^c$ | −1.6 |
| EX. 2 | 8 | 7755$^a$ | .007755$^c$ | 7287$^a$ .007287$^c$ | −6.0 |
| EX. 3 | 9 | 7959$^a$ | .007959$^c$ | 7051$^a$ .007051$^c$ | −11.4 |
| EX. 4 | 10 | 7755$^a$ | .007755$^c$ | 7082$^a$ .007082$^c$ | −8.7 |
| EX. 5 | 12 | 7755$^a$ | .007755$^c$ | 6808$^a$ .006808$^c$ | −12.2 |
| EX. 6 | 14 | 7755$^a$ | .007755$^c$ | 6143$^a$ .006143$^c$ | −20.8 |
| EX. 7 | 15 | 7963$^a$ | .007963$^c$ | 6270$^a$ .006270$^c$ | −14.5 |
| EX. 8 | 12 | 947$^a$ | .000947$^c$ | 903$^a$ .000903$^c$ | −4.6 |
| EX. 9 | 14 | 947$^a$ | .000947$^c$ | 901$^a$ .000901$^c$ | −4.9 |
| EX. 10 | 12 | 2735$^b$ | 2.735$^d$ | 1908$^b$ 1.908$^d$ | −30.2 |

*Not an example of the present invention.
$^a$Viscosity determined at 25° C. in centistokes (cks).
$^b$Viscosity determined at 85° C. in centipoise (cps).
$^c$Meter²/second (m²/s).
$^d$Pascal-second (Pa · s).
$^e$N/D = Not determined.
*Not an example of the present invention.
$^a$Viscosity determined at 25° C. in centistokes (cks).
$^b$Viscosity determined at 70° C. in centipoise (cps).
$^c$Meter²/second (m²/s).
$^d$Pascal-second (Pa · s).
$^e$N/D = Not determined.

phenolic hydroxyl group per molecule and (B) at least one aliphatic monocarboxylic acid containing from 7 to 15 carbon atoms per molecule; wherein components (A) and (B) are present in amounts which provide a ratio of carboxylic acid groups per epoxide group of from about 0.01:1 to about 0.2:1.

2. An adduct of claim 1 wherein
   (a) component (A) is an epoxy resin represented by the following Formulas II, III, IV or V:

FORMULA II

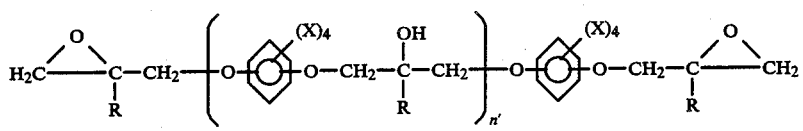

FORMULA III

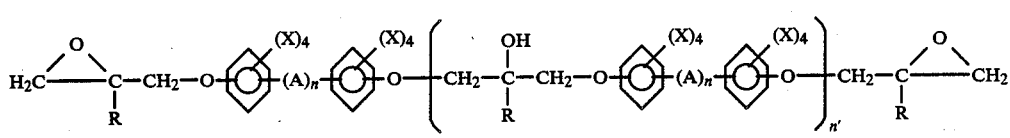

FORMULA IV

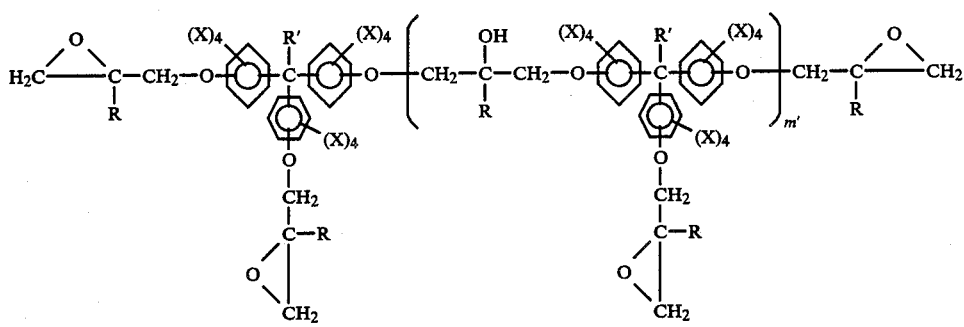

FORMULA V

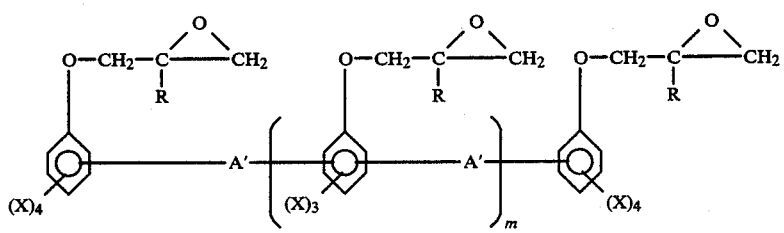

wherein each A is independently a divalent hydrocarbyl group having from 1 to about 12 carbon atoms, —S—, —S—S—, —SO—, —SO$_2$—, —CO— or —O—; each R is independently hydrogen or an alkyl group having from 1 to about 4 carbon atoms; R' is hydrogen or a hydrocarbyl group having from 1 to about 12 carbon atoms; each X is independently hydrogen, a hydrocarbyl or hydrocarbyloxy group having from 1 to about 12 carbon atoms, or a halogen atom; m has an average value from about 0.001 to about 3; m' has an average value from about 0.001 to about 3; n has a value of zero or 1; n' has an average value from zero to about 0.5;

(b) component (B) is a compound represented by the following formula I

Formula I

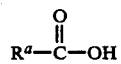

wherein $R^a$ is a monovalent aliphatic hydrocarbon group having from about 6 to about 14 carbon atoms; and (c) components (A) and (B) are employed in amounts which provide a ratio of equivalent of carboxylic acid to epoxide equivalent of from about 0.02:1 to about 0.15:1.

3. An adduct of claim 2 wherein
   (a) component (A) is an epoxy resin represented by Formula III wherein A is a divalent hydrocarbyl group having from 1 to about 6 carbon atoms; each R is hydrogen; each X is hydrogen, methyl or bromine; n has a value of 1 and n' has an average value from about 0.01 to about 0.2;
   (b) in component (B) $R^a$ has from about 7 to about 13 carbon atoms; and
   (c) components (A) and (B) are employed in amounts which provide a ratio of equivalent of carboxylic acid to epoxide equivalent of from about 0.03:1 to about 0.1:1.

4. An adduct of claim 3 wherein
   (a) component (A) is a diglycidyl ether of bisphenol A or a diglycidyl ether of bisphenol F or a combination thereof; and
   (b) Component (B) is lauric acid.

5. A thermosettable composition comprising (A) at least one adduct of claim 1 and (B) a curing amount of at least one suitable curing agent for component (A).

6. A thermosettable composition of claim 5 wherein said curing agent is a polyamine.

7. A thermosettable composition of claim 5 wherein said curing agent is triethylenetetramine.

8. A thermosettable composition comprising (A) at least one adduct of claim 2 and (B) a curing amount of at least one suitable curing agent for component (A).

9. A thermosettable composition of claim 8 wherein said curing agent is a polyamine.

10. A thermosettable composition of claim 9 wherein said curing agent is triethylenetetramine.

11. A thermosettable composition comprising (A) at least one adduct of claim 3 and (B) a curing amount of at least one suitable curing agent for component (A).

12. A thermosettable composition of claim 11 wherein said curing agent is a polyamine.

13. A thermosettable composition of claim 12 wherein said curing agent is triethylenetetramine.

14. A thermosettable composition comprising (A) at least one adduct of claim 4 and (B) a curing amount of at least one suitable curing agent for component (A).

15. A thermosettable composition of claim 14 wherein said curing agent is a polyamine.

16. A thermosettable composition of claim 15 wherein said curing agent is triethylenetetramine.

17. The product resulting from curing a composition containing the thermosettable composition of claim 5.

18. The producting resulting from curing a composition containing the thermosettable composition of claim 6.

19. The product resulting from curing a composition containing the thermosettable composition of claim 7.

20. The product resulting from curing a composition containing the thermosettable composition of claim 8.

21. The product resulting from curing a composition containing the thermosettable composition of claim 9.

22. The product resulting from curing a composition containing the thermosettable composition of claim 10.

23. The product resulting from curing a composition containing the thermosettable composition of claim 11.

24. The product resulting from curing a composition containing the thermosettable composition of claim 12.

25. The product resulting from curing a composition containing the thermosettable composition of claim 13.

26. The product resulting from curing a composition containing the thermosettable composition of claim 14.

27. The product resulting from curing a composition containing the thermosettable composition of claim 15.

28. The product resulting from curing a composition containing the thermosettable composition of claim 16.

29. A process for reducing the viscosity of a polyglycidyl ether of a compound containing an average of more than one phenolic hydroxyl group per molecule which process comprises reacting said polyglycidyl ether with at least one aliphatic monocarboxylic acid containing from 7 to 15 carbon atoms per molecule; wherein said polyglycidyl ether and aliphatic monocarboxylic acid are present in amounts which provide a ratio of carboxylic acid groups per epoxide group of from about 0.01:1 to about 0.2:1.

30. A process of claim 29 wherein
(a) said polyglycidyl ether is represented by the following Formulas II, III, IV or V:

FORMULA II
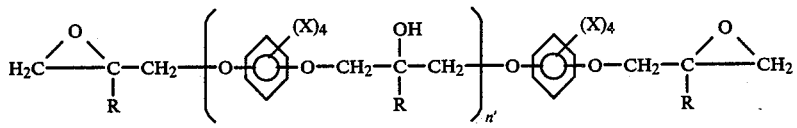

FORMULA III
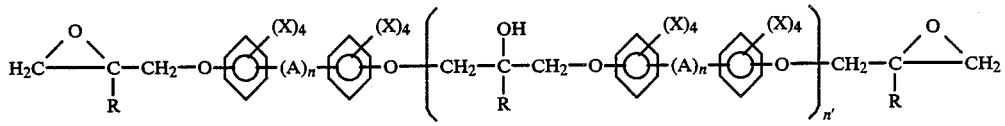

FORMULA IV
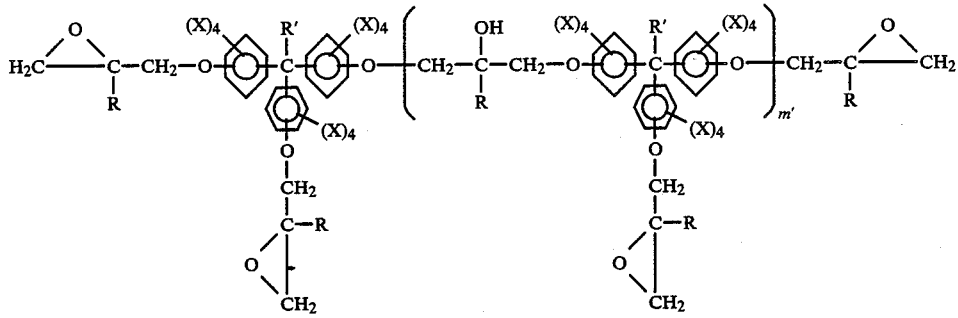

FORMULA V
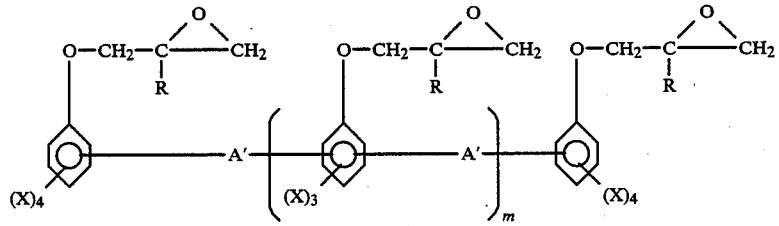

wherein each A is independently a divalent hydrocarbyl group having from 1 to about 12 carbon atoms, —S—, —S—S—, —SO—, —SO$_2$—, —CO— or —O—; each R is independently hydrogen or an alkyl group having from 1 to about 4 carbon atoms; R' is hydrogen or a hydrocarbyl group having from 1 to about 12 carbon atoms; each X is independently hydrogen, a hydrocarbyl or hydrocarbyloxy group having from 1 to about 12 carbon atoms, or a halogen atom; m has an average value from about 0.001 to about 3; m' has an average value from about 0.001 to about 3; n has a value of zero or 1; n' has an average value from zero to about 0.5;

(b) said acid is represented by the following formula I

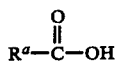

Formula I wherein R$^a$ is a monovalent aliphatic hydrocarbon group having at least about 6 carbon atoms; and (c) said polyglycidyl ether and acid are employed in amounts which provide a ratio of equivalent of carboxylic acid to epoxide equivalent of from about 0.02:1 to about 0.15:1.

31. A process of claim 30 wherein
(a) said polyglycidyl ether is represented by Formula III wherein A is a divalent hydrocarbyl group having from 1 to about 6 carbon atoms; each R is hydrogen; each X is hydrogen, methyl or bromine; n has a value of 1 and n' has an average value from about 0.01 to about 0.1;
(b) in Formula I, R$^a$ has from about 7 to about 13 carbon atoms; and
(c) said polyglycidyl ether and acid are employed in amounts which provide a ratio of equivalent of carboxylic acid to epoxide equivalent of from about 0.03:1 to about 0.1:1.

32. A process of claim 31 wherein
(a) component (A) is a diglycidyl ether of bisphenol A or a diglycidyl ether of bisphenol F or a combination thereof; and
(b) component (B) is lauric acid.

* * * * *

UNITED STATES PATENT AND TRADEMARK OFFICE
CERTIFICATE OF CORRECTION

PATENT NO. : 4,855,366

DATED : August 8, 1989

INVENTOR(S) : Cavitt

It is certified that error appears in the above-identified patent and that said Letters Patent is hereby corrected as shown below:

First Page, under "OTHER PUBLICATIONS", under "Libor Matejka"; change "Caboxy" to --Carboxyl--.

Column 2, line 66; change "includ" to --include--.

Column 2, line 66; change "ethe" to --the--.

Column 4, line 64; change "Handbood" to --Handbook--.

Column 4, line 68; change "handbood" to --handbook--.

Column 5, line 41; change "microsphers" to --microspheres--.

Column 5, line 53; change "ilustrative" to --illustrative--.

Column 6, line 7; change "Pas " to --Pa·s--.

Column 6, line 23; change "abouot" to --about--.

Column 6, line 25; change "EXPERIEMENT" to --EXPERIMENT--.

Column 7, line 19; change "(0.01256" to -- (0.001256--.

Column 7, line 35; change "cntrol" to --control--.

Column 7, line 42; change "hd" to --had--.

Column 8, line 20; change "abut" to --about--.

UNITED STATES PATENT AND TRADEMARK OFFICE
CERTIFICATE OF CORRECTION

PATENT NO. : 4,855,366

DATED : August 8, 1989

INVENTOR(S) : Cavitt

It is certified that error appears in the above-identified patent and that said Letters Patent is hereby corrected as shown below:

Column 9, line preceeding " Table I"; change "Pas" to --Pa·s--.

Column 9, "Table I", under column titled "Viscosity After Reaction With Acid"; change "3249$^a$" to --13249$^a$--.

Column 10, Table II, under column titled "Test No."; change " * " to --1*--.

Signed and Sealed this

Eighteenth Day of September, 1990

Attest:

HARRY F. MANBECK, JR.

*Attesting Officer*  *Commissioner of Patents and Trademarks*